(12) United States Patent
Tarabulski et al.

(10) Patent No.: US 7,467,749 B2
(45) Date of Patent: Dec. 23, 2008

(54) METHODS AND APPARATUS FOR INJECTING ATOMIZED REAGENT

(75) Inventors: Theodore J. Tarabulski, Brewster, NY (US); P. Robert Santangeli, Trumbull, CT (US); R. Gifford Broderick, Ridgefield, CT (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 137 days.

(21) Appl. No.: 11/112,039

(22) Filed: Apr. 22, 2005

(65) Prior Publication Data

US 2005/0235632 A1    Oct. 27, 2005

Related U.S. Application Data

(66) Substitute for application No. 60/565,356, filed on Apr. 26, 2004.

(51) Int. Cl.
*F02D 1/06*    (2006.01)
(52) U.S. Cl. .................. 239/5; 239/132.3; 239/132; 239/585.1; 239/533.2
(58) Field of Classification Search ............ 239/533.12, 239/533.11, 585.1, 585.2, 132, 133; 60/286
See application file for complete search history.

(56) References Cited

U.S. PATENT DOCUMENTS

| | | | |
|---|---|---|---|
| 2,235,834 A * | 3/1941 | Gillette et al. ............... | 239/491 |
| 3,958,757 A | 5/1976 | Happel et al. | |
| 4,292,947 A | 10/1981 | Tanasawa et al. | |
| 4,742,964 A * | 5/1988 | Ito et al. .................. | 239/397.5 |
| 4,805,837 A | 2/1989 | Brooks et al. | |
| 5,307,997 A * | 5/1994 | Wakeman .................... | 239/491 |
| 5,522,218 A | 6/1996 | Lane et al. | |
| 5,605,042 A * | 2/1997 | Stutzenberger .............. | 60/286 |
| 5,713,327 A | 2/1998 | Tilton et al. | |
| 5,924,280 A | 7/1999 | Tarabulski | |
| 5,976,475 A | 11/1999 | Peter-Hoblyn et al. | |
| 6,063,350 A | 5/2000 | Tarabulski et al. | |
| 6,257,496 B1 * | 7/2001 | Wyant ........................ | 239/5 |
| 6,279,603 B1 | 8/2001 | Czarnik et al. | |
| 6,470,676 B2 | 10/2002 | Dölling et al. | |
| 6,539,708 B1 | 4/2003 | Hofmann et al. | |
| 7,100,366 B2 * | 9/2006 | Hager et al. .................. | 60/286 |

FOREIGN PATENT DOCUMENTS

DE    24 18 227    10/1975

* cited by examiner

*Primary Examiner*—Dinh Q Nguyen
(74) *Attorney, Agent, or Firm*—Harness, Dickey & Pierce, PLC

(57) ABSTRACT

The present invention provides methods and apparatus for injecting reagent, such as an aqueous urea solution, into an exhaust stream in order to reduce oxides of nitrogen (NOx) emissions from diesel engine exhaust The present invention uses mechanical spill return atomization techniques to produce droplets approximately 50 μm SMD (Sauter mean diameter) or smaller. This size range is appropriate to allow urea to react into ammonia within the residence time associated with an on-road diesel engine. This effect is achieved through the use of a whirl plate having a plurality of whirl slots surrounding an exit orifice of the injector, which produce a high velocity rotating flow in the whirl chamber. When the rotating flow of reagent is passed through the exit orifice into an exhaust stream, atomization occurs from a combination of centrifugal force and shearing of the reagent by air as it jets into the exhaust stream.

39 Claims, 5 Drawing Sheets

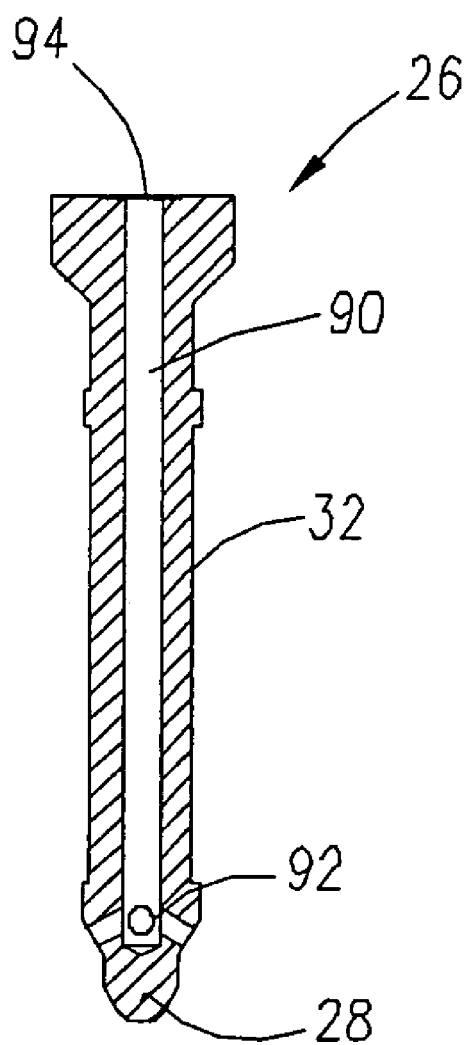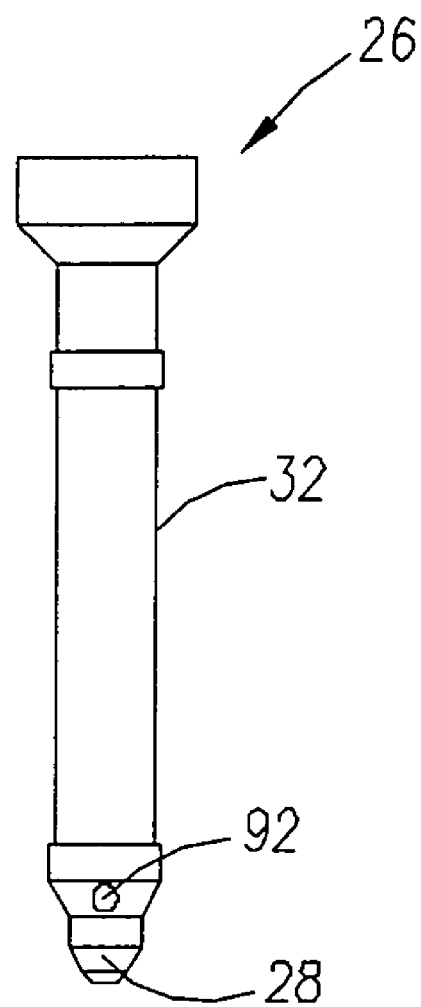
FIG. 4A                        FIG. 4B

METHODS AND APPARATUS FOR INJECTING ATOMIZED REAGENT

This application claims the benefit of U.S. Provisional Application No. 60/565,356, filed Apr. 26, 2004.

BACKGROUND OF THE INVENTION

The present invention relates generally to the reduction of emissions produced by lean burn engines. In particular, the present invention provides methods and apparatus for injecting reagent, such as an aqueous urea solution, into an exhaust stream in order to reduce oxides of nitrogen (NOx) emissions from diesel engine exhaust. Alternately, the present invention can be adapted for injecting a hydrocarbon reagent into a diesel exhaust for the purposes of particulate reduction.

Lean burn engines provide improved fuel efficiency by operating with an excess of oxygen over the amount necessary for complete combustion of the fuel. Such engines are said to run "lean" or on a "lean mixture." However, this increase in fuel economy is offset by undesired pollution emissions, specifically in the form of oxides of nitrogen (NOx).

One method used to reduce NOx emissions from lean burn internal combustion engines is known as selective catalytic reduction (SCR). SCR, when used, for example, to reduce NOx emissions from a diesel engine, involves injecting an atomized reagent into the exhaust stream of the engine in relation to one or more selected engine operational parameters, such as exhaust gas temperature, engine rpm or engine load as measured by engine fuel flow, turbo boost pressure or exhaust NOx mass flow. The reagent/exhaust gas mixture is passed through a reactor containing a catalyst, such as, for example, activated carbon, or metals, such as platinum, vanadium or tungsten, which are capable of reducing the NOx concentration in the presence of the reagent. An SCR system of this type is disclosed in U.S. Pat. No. 5,976,475.

An aqueous urea solution is known to be an effective reagent in SCR systems for diesel engines. However, use of such an aqueous urea solution involves many disadvantages. Urea is highly corrosive and attacks mechanical components of the SCR system, such as the injectors used to inject the urea mixture into the exhaust gas stream. Urea also tends to solidify upon prolonged exposure to high temperatures, such as encountered in diesel exhaust systems. Solidified urea will accumulate in the narrow passageways and exit orifice openings typically found in injectors. Solidified urea may foul moving parts of the injector and clog any openings, rendering the injector unusable.

In addition, if the urea mixture is not finely atomized, urea deposits will form in the catalytic reactor, inhibiting the action of the catalyst and thereby reducing the SCR system effectiveness. High injection pressures are one way of minimizing the problem of insufficient atomization of the urea mixture. However, high injection pressures often result in over-penetration of the injector spray plume into the exhaust stream, causing the plume to impinge on the inner surface of the exhaust pipe opposite the injector. Over-penetration leads to inefficient use of the urea mixture and reduces the range over which the vehicle can operate with reduced NOx emissions. Only a finite amount of aqueous urea can be carried on a vehicle, and what is carried should be used efficiently to maximize vehicle range and reduce the need for frequent fill ups of the reagent.

Further, aqueous urea is a poor lubricant. This characteristic adversely affects moving parts within the injector and requires that special fits, clearances and tolerances be employed between relatively moving parts within an injector. Aqueous urea also has a high propensity for leakage. This characteristic adversely affects mating surfaces requiring enhanced sealing resources in many locations.

An example of a prior art injector for injecting aqueous urea into the exhaust stream of a lean burn diesel engine is described in U.S. Pat. No. 6,279,603. This prior art injector uses an atomizing hook external to the injector to cause dispersion of the urea solution expelled from the injector. The urea solution is circulated in the area of the exit orifice of the injector body to provide cooling.

It would be advantageous to provide methods and apparatus for injecting an aqueous urea solution into the exhaust stream of a lean burn engine where atomizing of the urea solution occurs internally to the injector prior to being injected into the exhaust stream. It would be further advantageous to provide for cooling of the injector to prevent the urea from solidifying and to prolong the life of the injector components. It would be advantageous to minimize heat transfer to the injector from the exhaust pipe for minimal deposit formation internal to the injector. It would also be advantageous to minimize heat transfer from the hot gas to the exit orifice to prevent soot and urea from being attracted to the relatively cool injector exit orifice, creating deposits external to the injector. It would also be advantageous to provide an injector that does not leak for economical and environmental purposes.

The methods and apparatus of the present invention provide the foregoing and other advantages.

SUMMARY OF THE INVENTION

The present invention provides improved methods and apparatus for injecting a reagent, such as an aqueous urea solution, into an exhaust stream in order to reduce oxides of nitrogen (NOx) emissions from diesel engine exhaust. In particular, the injector of the present invention is an enhanced performance atomizer for use with any diesel or natural gas engine.

Current smaller displacement on and off-road diesel engine urea injectors utilize dual reagent atomization techniques. This process requires a separate air compressor. Other prior art atomization techniques, such as that disclosed in U.S. Pat. No. 6,279,603 ('603 patent) utilize an injector which does not have an atomization process internal to the injector. The injector described in the '603 patent sprays a free jet of liquid that produces small droplets upon impacting a hot plate or hook positioned on the outside of the injector body.

The present invention provides improvements to prior art aqueous urea injectors, in particular, improvements to an aqueous urea injector of the type described in the '603 patent. The present invention utilizes atomization techniques that occur internal to the injector. In particular, the present invention uses mechanical spill return atomization techniques to produce droplets smaller than anticipated by the inventors, in particular, droplets approximately 50 μm SMD (Sauter mean diameter) or smaller. This size range is appropriate to allow urea to react into ammonia within the residence time associated with an on-road diesel engine, unlike the injector described in the '603 patent. This effect is achieved through the use of a whirl plate having a plurality of whirl slots surrounding the exit orifice of the injector, which produce a high velocity rotating flow in the whirl chamber. When a portion of the rotating flow of reagent is passed through the exit orifice into an exhaust stream, atomization occurs from a combination of centrifugal force and shearing of the reagent by air as it jets into the exhaust stream.

In addition, the present invention provides further improvements over the injector of the '603 patent, including increased magnetic pull strength of the metering plug over a wide temperature range, prolonged life of the injector valve and associated actuating components, and cooling with the urea throughout the injector. Additionally, the present invention incorporates adjustable spray quality characteristics on line, and interchangeability of orifice plates for multiple size applications. The ribbed injector body provides additional cooling capability.

The present invention may be further adapted to provide an injector for injecting hydrocarbons particularly for the purpose of particulate reduction in a diesel exhaust. The combination of pulse width modulation providing instantaneous timing control and mechanical atomization techniques is appropriate for providing small quantities of hydrocarbons with precise timing. The cooling aspects provided by the present invention allow the injector to survive the hot exhaust conditions as well as prevent pre-ignition of the hydrocarbon.

In an example embodiment of the present invention, methods and apparatus for injecting atomized reagent are provided. A low pressure injector is provided, which comprises an injector body, and a whirl chamber arranged on the injector body. The whirl chamber has an exit orifice. A plurality of whirl slots may be provided in the whirl chamber for imparting a rotational velocity to reagent introduced into the whirl chamber. A valve seat positioned within the whirl chamber surrounds the exit orifice. A metering plug may be arranged within the injector body. An actuator may also be mounted on the injector body and connected to the metering plug for moving the metering plug between closed and open positions. The actuator may be located in the injector body and connected to the metering plug for enabling movement of the metering plug from the closed position to the open position.

The metering plug may be located in the injector body such that when the metering plug is in a closed position, the metering plug is seated in the valve seat preventing reagent from being dispensed from the exit orifice. In one example embodiment, the reagent may be circulated through the injector to cool the injector when the metering plug is in the closed position. When the metering plug is in the open position, the metering plug is removed from the valve seat allowing reagent to be dispensed from the exit orifice. In the open position, the end of the metering plug is removed from the valve seat, and a portion of the rotating flow of reagent from the whirl chamber is passed through the exit orifice, where atomization occurs from a combination of centrifugal force and shearing of the reagent by air as it is dispensed into the exhaust stream.

The injector may further comprise a reagent inlet extending into the injector and a reagent outlet extending out of the injector. The reagent inlet and reagent outlet may communicate with the whirl chamber via a hollow portion of the metering plug. The reagent inlet, the reagent outlet, and the hollow portion of the metering plug may provide a flow path for reagent through the injector, thereby enabling cooling of the injector. The flow path for the reagent through the injector may be provided independently of the position of the metering plug.

A metering orifice located in the injector body may control the flowrate of cooling reagent flowing through the injector at a given inlet pressure. The reagent may be a urea solution or a hydrocarbon.

In a further example embodiment, a plurality of ribs, surrounding the injector body, may be provided to disperse heat away from the injector body. A heat shield, surrounding the exit orifice, may also be provided to decrease the heat transfer from the exhaust stream to the injector body. The heat shield may have an aperture therethrough aligned with the exit orifice, thereby allowing reagent released from the whirl chamber to pass through the heat shield. The heat shield may comprise a plate surrounding the exit orifice and a layer of insulating material arranged on the plate.

The injector body and metering plug may comprise stainless steel. A biasing member may be provided to bias the metering plug into the closed position, thereby providing a fail-closed valve. The biasing member may be a coil spring arranged coaxially with the metering plug.

The actuator may comprise a magnetic coil generating a magnetic force. The magnetic force may effect a sliding motion of the metering plug against the biasing member when the magnetic coil is energized. The metering plug may thereby be moved from the closed position to the open position within the whirl chamber when the actuator is energized, enabling reagent to be dispensed from the exit orifice of the whirl chamber. Means for energizing the magnetic coil may be provided. For example, a 12 V pulse width modulated signal may energize the magnetic coil for a definite time period to inject a certain amount of reagent. Other means for energizing the magnetic coil which will be apparent to those skilled in the art may also be employed.

A method of injecting a reagent into a gas stream is also provided in accordance with the invention. The method includes introducing a reagent into an injector body, providing a predetermined pressure setpoint for pressurizing the reagent in the injector body, imparting a high velocity rotating flow to at least a portion of the pressurized reagent within the injector body, and metering a precise amount of the reagent having a rotational velocity from an exit orifice into a gas stream.

The reagent in excess of the amount precisely metered may be maintained in and circulated through the injector to maintain the reagent within a desired temperature range. The desired temperature range may be approximately 5° C. to 85° C. for a urea solution comprising aqueous urea. The reagent may alternatively be a hydrocarbon. The gas stream may be a diesel exhaust stream. The predetermined pressure setpoint may be varied in response to operating conditions to provide an increased operating range and/or varied spray patterns.

Apparatus providing means to accomplish the methods described herein are also provided in accordance with the present invention.

BRIEF DESCRIPTION OF THE DRAWINGS

The present invention will hereinafter be described in conjunction with the appended drawing figures, wherein like numbers denote like elements, and:

FIG. 4 (FIGS. 4A and 4B) shows an example embodiment of a metering plug used in the injector of FIG. 2.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an example embodiment of the invention. It should be understood that various changes may be made in the function and arrangement of elements without departing from the spirit and scope of the invention as set forth in the appended claims.

Figure 1:
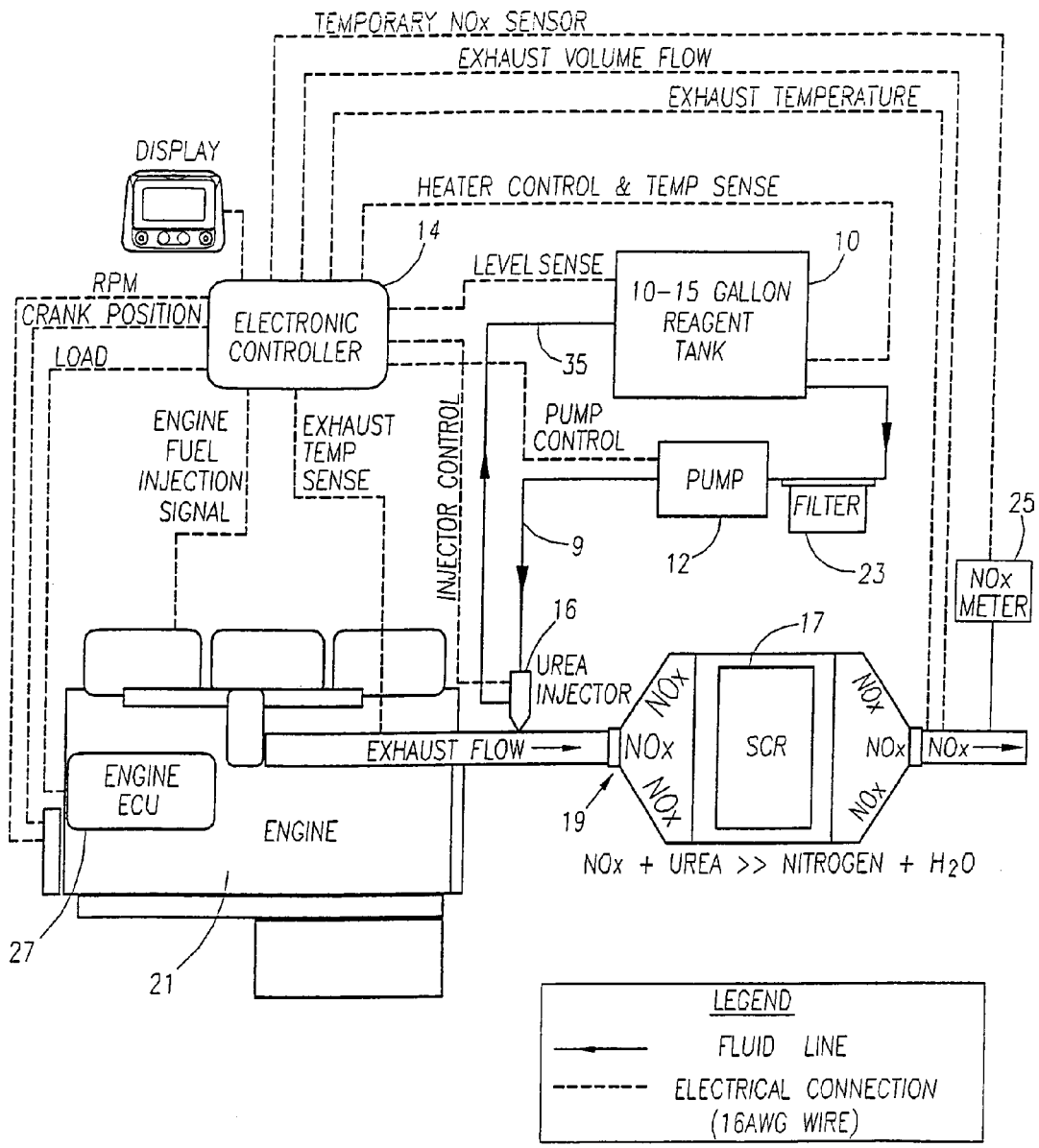
FIG. 1 shows a schematic diagram of an example embodiment of an on-road diesel engine with a pollution emission control system using an injector according to the present invention.

FIG. 1 shows an example pollution control system for reducing NOx emissions from the exhaust of a diesel engine 21. In FIG. 1, solid lines between the elements of the system denote fluid lines for reagent and dashed lines denote electrical connections. The system of the present invention may include reagent tank 10 for holding the reagent (e.g., aqueous urea or a hydrocarbon) and a delivery module 12 for delivering the reagent from the tank 10. The tank 10 and delivery module 12 may form an integrated reagent tank/delivery module. Also provided as part of the system is an electronic injection control unit 14, a low pressure injector module 16, and an exhaust system 19 having at least one catalyst bed 17.

The delivery module 12 may comprise a pump that is supplied reagent from the tank 10 through an in-line filter 23 via a supply line 9. The reagent tank 10 may be polypropylene, epoxy coated carbon steel, PVC, or stainless steel and sized according to the application (e.g., vehicle size, intended use of the vehicle, and the like). The filter 23 may include a housing constructed of rigid plastic or stainless steel with a removable cartridge. A pressure regulator (not shown) may be provided to maintain the system at predetermined pressure setpoint (e.g., relatively low pressures of approximately 60-80 psi) and may be located in the return line 35 from the injector 16. A pressure sensor may be provided in the flexible line leading to the reagent injector 16. The system may also incorporate various freeze protection strategies to unthaw frozen urea or to prevent the urea from freezing. For example, during system operation, regardless of whether or not the injector is releasing reagent into the exhaust gases, reagent is circulated continuously between the tank 10 and the injector 16 to cool the injector and minimize the dwell time of the reagent in the injector so that the reagent remains cool. Continuous reagent circulation is necessary for temperature-sensitive reagents, such as aqueous urea, which tend to solidify upon exposure to elevated temperatures of 300° C. to 650° C. as would be experienced in an engine exhaust system. It has been found to be important to keep the urea mixture below 140° C. and preferably in a lower operating range between 5° C. and 95° C. to provide a margin of safety ensuring that solidification of the urea is prevented. Solidified urea, if allowed to form, would foul the moving parts and openings of the injector, eventually rendering the injector useless. It will be recognized that flow rates will depend on engine size and NOx levels.

The amount of reagent required may vary with load, engine RPM, engine speed, exhaust gas temperature, exhaust gas flow, engine fuel injection timing, and desired NOx reduction. All or some of the engine operating parameters may be supplied from the engine control unit 27 via the engine/vehicle databus to the reagent injection controller 14. The reagent injection control unit 14 could also be included as part of the engine control unit 27 if the truck manufacturer agrees to provide that functionality.

Exhaust gas temperature, exhaust gas flow and exhaust back pressure may be measured by respective sensors.

A minimum reagent level switch or programmed logic based on voltage may be used to prevent the injection system from running dry and overheating. Once a minimum reagent level in the tank 10 is reached, injection will cease and a fault light and/or a text alarm will illuminate in the cab of the vehicle.

The injection rate may be set by programming the reagent injection control unit 14 with an injection control strategy or map, as described in commonly owned co-pending U.S. Pat. No. 6,941,746 issued on Sep. 13, 2005 entitled "Mobile Diesel Selective Catalytic Reduction Systems and Methods" which is incorporated herein and made a part hereof by reference. As described therein, the injection strategy may be developed by temporarily installing a NOx detector 25 on the vehicle. The NOx detector 25 may be a sensor or a meter with a sampling system. FIG. 1 shows a NOx meter 25 which analyzes the gas concentration or mass at a location external to the exhaust system 19.

Figure 2:
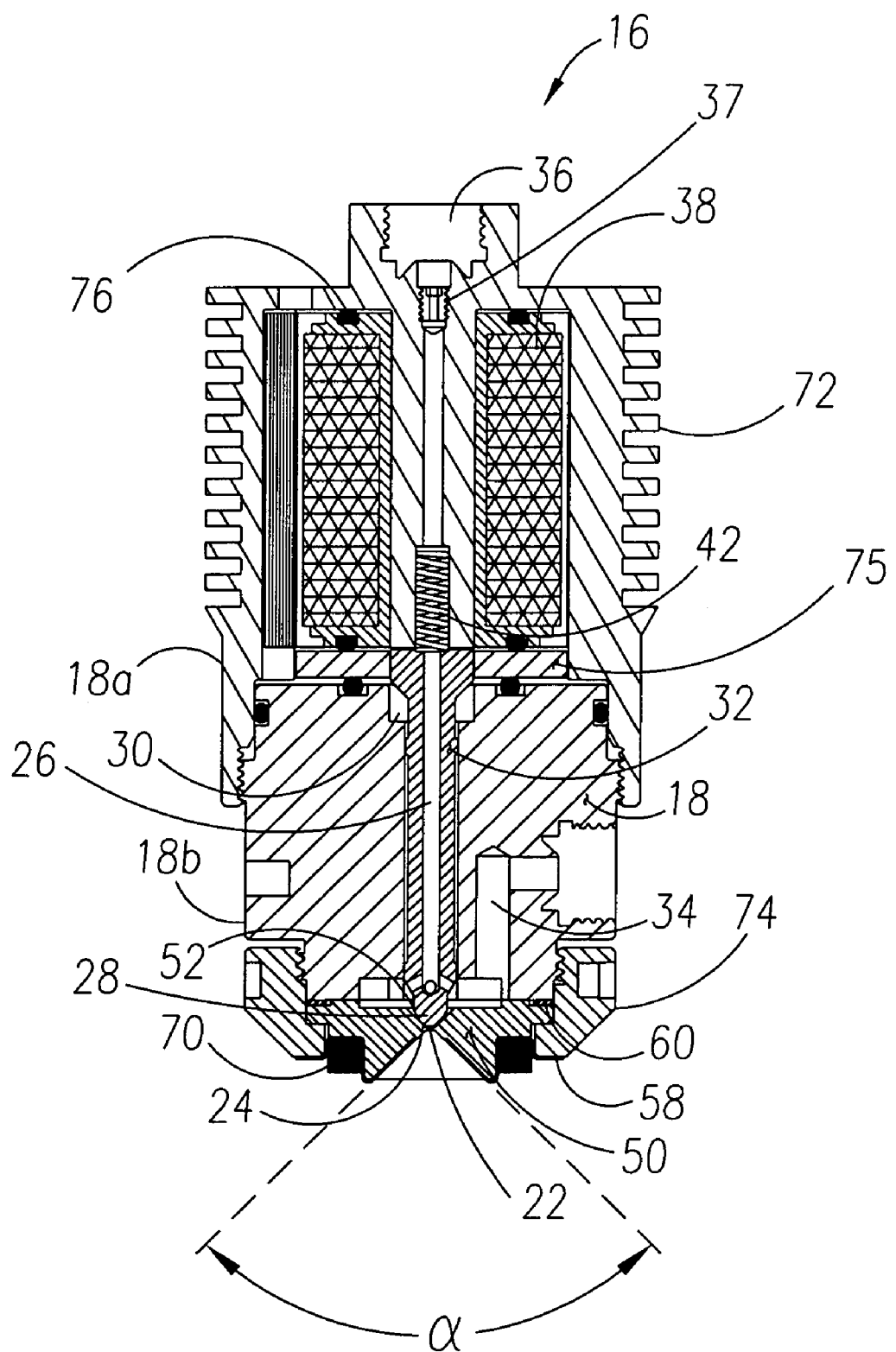
FIG. 2 shows a longitudinal cross-sectional view of an example embodiment of an injector according to the invention.

FIG. 2 shows a cross-sectional view of an example embodiment of the injector 16 according to the present invention, which may be used in the system shown in FIG. 1. Injector 16 may comprise an injector body 18 having an upper section 18a and a lower section 18b. An elongated cylindrical chamber 30 may be disposed within the injector body 18. The chamber 30 may be in fluid communication with a whirl plate 50, which has an exit orifice 22 that opens onto the exhaust gases within the exhaust system 19 (FIG. 1) of a diesel engine when mounted thereon. Surrounding exit orifice 22 may be a valve seat 24 which can have any practical shape but is preferably conical (as shown, for example, in FIG. 3B). A valve member in the form of an elongated metering plug 26 may be slidably mounted within the chamber 30.

Figure 3A:
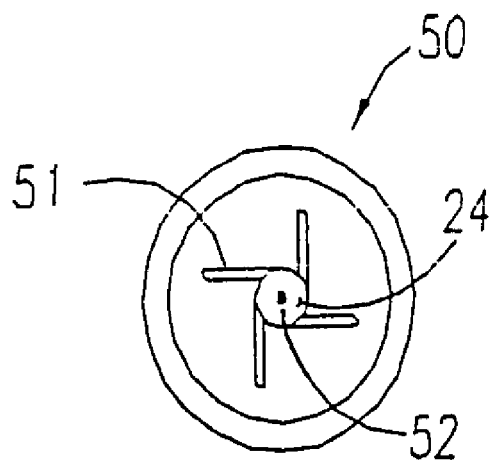
FIG. 3 (FIGS. 3A, 3B, and 3C) shows top, cross-sectional, and bottom views of an example embodiment of a whirl plate in accordance with the present invention.
Figure 3B:
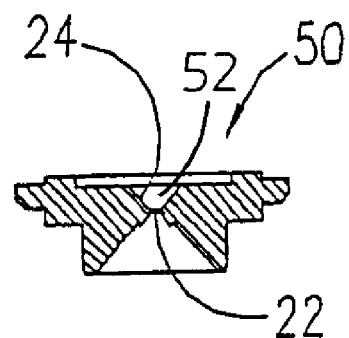
Figure 3C:
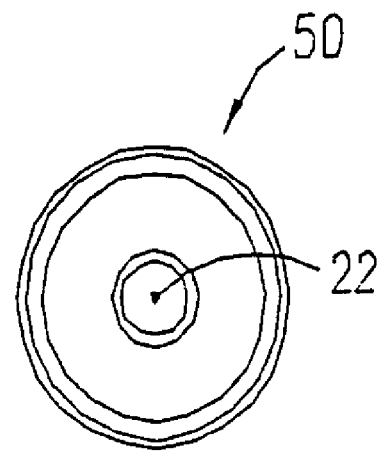

FIG. 3A shows a top view of the whirl plate 50. FIG. 3B shows a cross-sectional view of the whirl plate 50. FIG. 3C shows a bottom view of the whirl plate 50. As can be seen from FIG. 3A, the whirl plate 50 may include a plurality of whirl slots 51 surrounding the valve seat 24 and forming a whirl chamber 52 in the area surrounding the end 28 of the metering plug 26 (see FIG. 2). As shown in FIG. 3B, the whirl chamber 52 may be a conical whirl chamber when defined by a conically shaped valve seat 24. As can be seen from FIGS. 3A and 3B, the valve seat 24 surrounds the exit orifice 22 for dispensing the atomized reagent from the whirl chamber 52. The whirl plate 50 may be affixed to the lower section of the injector body 18b by a retaining cap 74.

In the example configuration shown, a fluid-retaining gasket 60 may be interposed between the whirl plate 50 and the lower portion of the injector body 18b to prevent reagent from leaking between the mating surfaces of the whirl plate 50, injector body 18 and retaining cap 74. The gasket may comprise a silicone material. The upper injector body 18a may include several sealing O-Rings 76 interposed between mating surfaces of the upper injector body 18a and lower injector body 18b, lower injector body 18b and bottom plate 75, bottom plate 75 and coil 38, and coil 38 and upper injector body 18a to prevent reagent leaks.

FIGS. 4A and 4B show cross-section and exterior views, respectively, of an example embodiment of metering plug 26. Metering plug 26 may have an end 28 formed to sealingly engage valve seat 24, thereby closing exit orifice 22 from fluid communication with the whirl chamber 52. Metering plug 26 may be movable within the whirl chamber 52 between the closed position shown in FIG. 2 and an open position wherein end 28 is removed from sealing engagement with valve seat 24. In the open position, exit orifice 22 is opened to fluid communication with the whirl chamber 52.

Reagent may be delivered to the whirl chamber 52 via a reagent inlet 34 (FIG. 2). Reagent inlet 34 may be in fluid communication with the whirl chamber 52 and may be externally connected to tank 10 via supply line 9. Reagent, such as aqueous urea reagent or a hydrocarbon, may be pumped at a predetermined pressure setpoint into the reagent inlet 34 and into the whirl chamber 52. The pressurized reagent may be accelerated to high velocity in the whirl slots 51. This produces a high velocity rotating flow in the whirl chamber 52. When the end 28 of the metering plug is removed from the valve seat 24, a portion of the rotating flow of reagent is passed through exit orifice 22, where atomization occurs from a combination of centrifugal force and shearing of the reagent by air as it jets into the exhaust stream.

The predetermined pressure setpoint may vary in response to operating conditions to provide at least one of increased operating range and varied spray patterns from the exit orifice 22.

To effect the opening and closing of the exit orifice 22, an actuator may be provided, for example in the form of magnetic coil 38 mounted in the injector body 18. When the magnet 38 is energized, the metering plug 26 is drawn upward from the closed position to the open position. The bottom plate 75 and the upper injector body 18a may be constructed of magnetic stainless steel to provide a magnetized surface while retaining the corrosion resistant characteristics. The bottom injector body 18b may be constructed of a non-magnetic stainless steel such as type 316 stainless steel. This enhances the isolation of the magnetic characteristic at the bottom plate 75 and limits the potential for the metering plug 26 to be magnetized toward the exit orifice 22. The magnet would be energized, for example, in response to a signal from electronic controller 14 of FIG. 1, which decides, based upon sensor input signals and its preprogrammed algorithms, when reagent is needed for effective selective catalytic reduction of NOx emissions in the exhaust stream.

Figure 5:
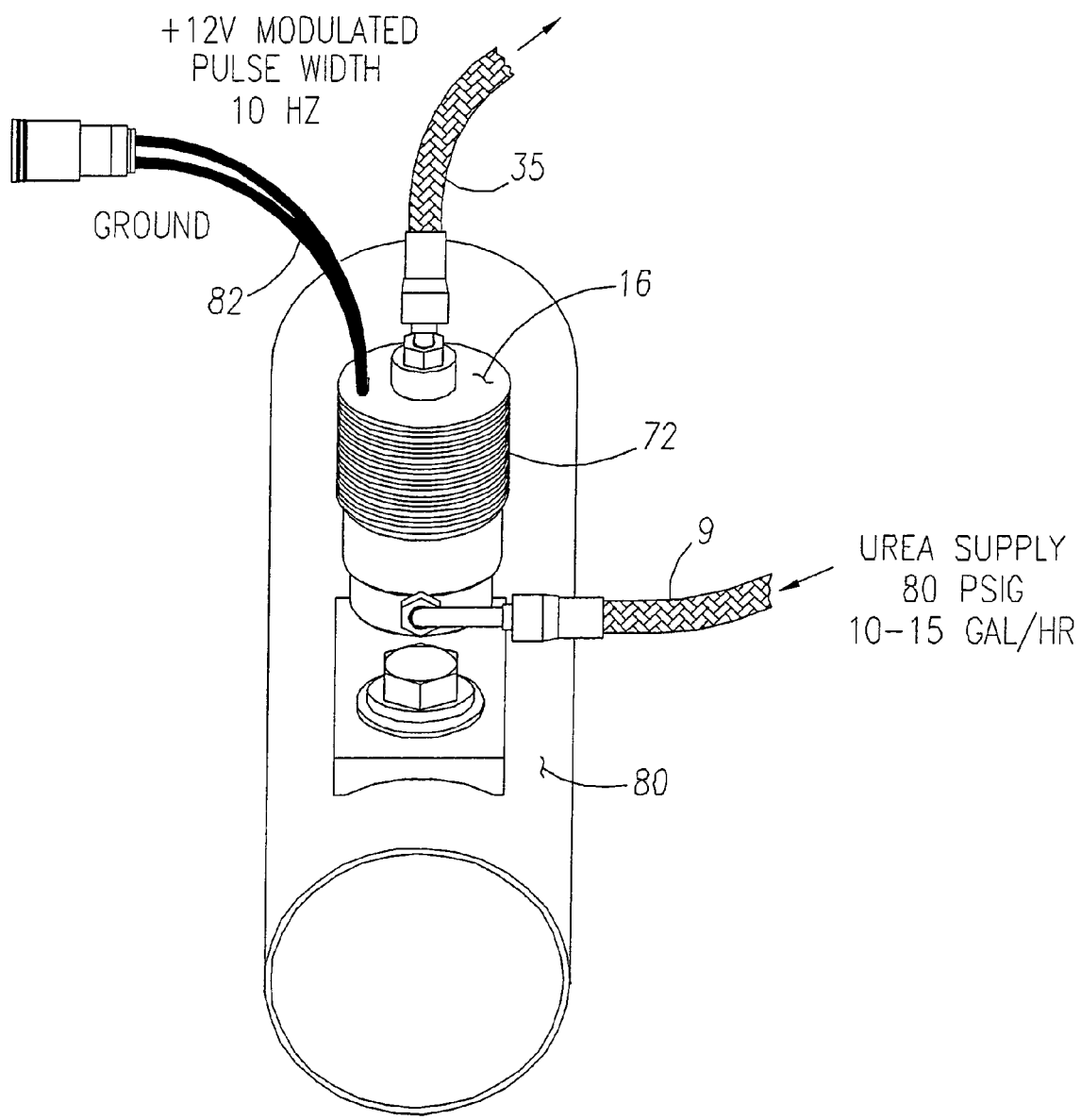
FIG. 5 shows a perspective view of an example embodiment of an injector mounted on an exhaust tube in accordance with the present invention.

FIG. 5 shows an external view of the injector 16 connected to an exhaust tube 80. Electrical connections 82 may be provided for providing a control signal to the injector 16, for example from the reagent injection controller 14 (FIG. 1). The magnetic coil 38 may be energized by a 12-24 VDC current with a pulse width modulated digital signal.

As shown in FIG. 4A, the metering plug 26 includes a hollow section 90 which may be in fluid communication with the whirl chamber 52 via bores 92 in the metering plug 26. The hollow portion 90 of the metering plug 26 may extend at least within the lower section 18b of the injector body 18 (FIG. 2). The pressurized reagent from the whirl chamber 52 which is not expelled from exit orifice 22 may be forced into bores 92, into the hollow section 90 and ultimately into outlet 36 through an outlet section in the hollow top portion 94 of the metering plug 26. The reagent outlet 36 may be positioned as shown in FIG. 2 for removing reagent from the top portion 94 of the hollow section 90 of metering plug 26. Reagent outlet 36 may be externally connected to return line 35 (FIG. 5), thus permitting the reagent to circulate from the tank 10 of FIG. 1, through supply line 9, through reagent inlet 34, into the whirl chamber 52, through bores 92, through the hollow section 90 of metering plug 26, out of the outlet section in the hollow top portion 94 and into reagent outlet 36, through return line 35 and back into tank 10 of FIG. 1. This circulation keeps the injector 16 cool and minimizes the dwell time of the reagent in the injector. The reagent inlet 34, reagent outlet 36, and the hollow portion 90 of the metering plug 26 may provide a flow path for reagent flowing through the injector 16, thereby enabling cooling of the injector 16. The flow path for reagent through the injector 16 may be independent of the position of the metering plug 26. A metering orifice 37 may be provided for controlling the amount of cooling reagent flowing through the injector 16.

Thus, for example, aqueous urea, when used with this cooled injector 16, will not solidify anywhere within the injector 16, and in particular in the area of the whirl chamber 52. If allowed to solidify, the urea could prevent metering plug 26 from seating properly or could cause the metering plug 26 to seize in either the open or closed position and/or the exit orifice 22 could become clogged. In addition, the detrimental effects of elevated temperature on the reagent, the moving parts, and the openings of the valve are avoided. For example, by directly cooling the injector, increased performance is achieved in comparison with the prior art, which provides cooling only in the region of the valve seat. Further, the increased cooling provides for prolonged life of the injector components, including the metering plug 26 and associated actuating components, and the valve seat 24. Cooling ribs 72 provided on the exterior of the upper portion of the injector body 18a provide additional cooling capacity.

As an example, approximately 10 gallons of reagent may be circulated through the injector per hour, which is greater than an amount of reagent dispensed from the exit orifice 22. This flow rate may be varied depending on the application. Upon removing the end 28 of the metering plug 26 from the valve seat 24, atomized reagent may be expelled at the rate of approximately 3-500 grams per minute, depending on the application and/or the control algorithm used. The spray characteristics of reagent expelled from the exit orifice 22 may be varied depending on the pressure ratios of the pressure maintained in the return and supply lines. For example, the size of the droplets may be controlled by varying the pressure in the supply line 9. In addition, the spray characteristics may be varied by interchanging different spray plates. For example, the spray plate 50, which is affixed to the injector body by retaining cap 74, may be removed and replaced with spray plates with different sized exit orifices 22, a different number of whirl slots 51, or whirl slots of different length, depth or width. Further, spray plates may be configured to provide larger or smaller whirl chambers 52 when affixed to lower section of the injector body 18a. The reagent circulation rate can also be varied by modifying the internal diameter of metering orifice 37. Varying the reagent circulation rate changes the droplet size and impacts the level of cooling provided by the reagent.

A circular guide section 32 of the metering plug 26 may provide the main guiding function for sliding motion of the metering plug 26 within the chamber 30. The tolerance between the circular guide section 32 and the chamber 30 is sufficient to allow relative motion and lubrication of the metering plug 26 while still guiding the metering plug's motion.

Generally the specific tolerances required at the various sections between the metering plug 26 and the chamber 30 will vary according to the operating temperature, operating pressure, the desired flow rate and circulation rate of the reagent, the tribological properties of the reagent and the materials chosen for the metering plug 26 and injector body 18. The tolerances for optimum injector performance may be obtained experimentally through field trials.

As seen in FIG. 2, metering plug 26 may be biased in the closed position by a biasing member, which may be, for example, in the form of a coil spring 42 coaxially arranged with the hollow top portion 94 of the metering plug 26, which serves as a spring seat against which the spring 42 can push to bias the metering plug 26.

In the configuration shown, a thermal shield 58 may be mounted externally to the whirl plate 50 and retaining cap 74 prevents heat from the exhaust gases from being transferred to the whirl plate 50 and injector body 18 while simultaneously providing a heated surface ensuring that droplets unintentionally contacting the injector body do not form deposits. For example, the thermal shield 58 may be made of inconel. Alternatively, the exit orifice 22 may be recessed from the injector 16, or moved to the outside or injecting end of the whirl plate 50, thereby increasing spray angle α and also allowing a wider range of spray angles while retaining the cooling properties. Thermal gasket 70 may be made of a flexible graphite foil sheathed in stainless steel material whose low thermal conductivity serves to isolate injector body 18 and the whirl plate 50 from the hot exhaust tube 80, reducing conductive heat transfer to the injector 16 and thereby helping to keep the reagent circulating within the valve cool.

The metering plug 26 may be made of type 430C or 440F stainless steel preferably coated with a coating that retains the urea corrosion resistance and the magnetic properties while reducing the metal fatigue caused over the life of the injector. The whirl plate 50 may be made of inconel or type 316 stainless steel and coated with a coating that retains the urea corrosion resistance while reducing the metal fatigue caused over the life of the injector 16. The bottom plate 75 may be separated from the metering plug 26 and the metering plug 26 may be shortened to the shortest length reasonable for manufacturing to provide a significantly reduced metering plug mass. The decreased mass of the metering plug 26 prolongs the life of the plug, and in particular prolongs the life of the end 28 of the metering plug, which is subject to wear and deformation from repeated impact on the valve seat 24.

It should now be appreciated that the present invention provides advantageous methods and apparatus for injecting an aqueous urea solution into the exhaust stream on an on-road diesel engine in order to reduce NOx emissions.

Although the invention has been described in connection with various illustrated embodiments, numerous modifications and adaptations may be made thereto without departing from the spirit and scope of the invention as set forth in the claims.

What is claimed is:

1. A low pressure atomizing injector for injecting reagent, comprising:
    an injector body having an upper section and a lower section;
    a reagent inlet extending into said lower section of said injector body;
    a reagent outlet extending out of said upper section of said injector body;
    a conical whirl chamber having an exit orifice, said whirl chamber arranged on said lower section of said injector body;
    a plurality of whirl slots in said whirl chamber for imparting a rotational velocity to reagent introduced into said whirl chamber;
    a valve seat positioned within said whirl chamber surrounding said exit orifice;
    a metering plug arranged within said injector body, a hollow portion of said metering plug extending within said lower section of said injector body; and
    an actuator mounted on said injector body and connected to said metering plug for moving said metering plug between closed and open positions; wherein:
    said reagent inlet and reagent outlet communicate with said whirl chamber via a hollow portion of said metering plug; and
    said reagent inlet, said whirl slots, said whirl chamber, said hollow portion of said metering plug, and said reagent outlet provide a flow path for reagent through said injector body, thereby enabling continuous cooling of said injector in both the open and closed position of said metering plug.

2. An injector according to claim 1, wherein:
    in said open position, atomized reagent is dispensed from said exit orifice at a rate of approximately 3 to 500 grams per minute.

3. An injector according to claim 1, further comprising a metering orifice in the reagent outlet for controlling the amount of said cooling reagent flowing through said flow path.

4. An injector according to claim 1, wherein:
    said hollow portion of said metering plug extends substantially through a length of said metering plug.

5. An injector according to claim 4 wherein:
    a plurality of bores are provided in a tip section of said metering plug proximate the whirl chamber, said plurality of bores being connected with a first end of said hollow portion of said metering plug;
    an outlet section is provided in a top portion of said metering plug opposite said tip section, said outlet section being connected with a second end of said hollow portion of said metering plug; and
    reagent flows from said reagent inlet, into said plurality of bores, through said hollow portion, out of said outlet section of said metering plug, and into said reagent outlet independent of the position of said metering plug.

6. An injector according to claim 1, further comprising a plurality of ribs surrounding said injector body for dispersing heat away from said injector body.

7. An injector according to claim 1, further comprising a heat shield surrounding said exit orifice, said heat shield having an aperture therethrough aligned with said exit orifice, thereby allowing reagent released from said whirl chamber to pass through said heat shield.

8. An injector according to claim 7, wherein said heat shield comprises:
    a plate surrounding said exit orifice; and
    a layer of insulating material arranged on said plate.

9. An injector according to claim 1, wherein said injector body and said metering plug comprise stainless steel.

10. An injector according to claim 1, further comprising a biasing member located within said injector body for biasing said metering plug into said closed position.

11. An injector according to claim 10, wherein said biasing member comprises a coil spring coaxially arranged with said metering plug.

12. An injector according to claim 10, wherein said actuator comprises:
    a magnetic coil generating a magnetic force, said magnetic force effecting a sliding motion of said metering plug against said biasing member when said magnetic coil is energized thereby moving said metering plug from said closed position to said open position within said whirl chamber to enable reagent to be released from said whirl chamber through said exit orifice; and
    means for energizing said magnetic coil.

13. An injector according to claim 1, wherein said reagent comprises a urea solution.

14. An injector according to claim 1, wherein said reagent comprises a hydrocarbon.

15. An injector in accordance with claim 1, further comprising:
- means for introducing the reagent into the injector body;
- means for providing a predetermined pressure setpoint for pressurizing said reagent in said injector body;
- wherein said metering plug meters a precise amount of said reagent having said rotational velocity from said exit orifice.

16. An injector according to claim 15, wherein the reagent comprises a urea solution.

17. An injector according to claim 15, wherein said reagent comprises a hydrocarbon.

18. An injector according to claim 15, wherein said gas stream comprises a diesel exhaust stream.

19. An injector according to claim 15, wherein said predetermined pressure setpoint varies in response to operating conditions to provide at least one of increased operating range and varied spray patterns.

20. An injector in accordance with claim 15, wherein varying said predetermined pressure setpoint varies a droplet size of said reagent metered from said exit orifice.

21. An injector in accordance with claim 20, wherein said droplet size is within a range of approximately 50 μm SMD or smaller.

22. An injector in accordance with claim 15, wherein varying said predetermined pressure setpoint varies a flow rate of said reagent metered from the exit orifice.

23. An injector in accordance with claim 22, wherein said flow rate of said reagent metered from said exit orifice is in a range of approximately 3 to 500 grams per minute.

24. An injector in accordance with claim 22, wherein varying the flow rate further varies at least one of (1) a droplet size of said reagent metered from said exit orifice; and (2) an amount of cooling provided by circulating reagent remaining in the injector body through the injector body.

25. An injector according to claim 1, wherein said reagent is circulated through said flow path to maintain said reagent in said injector body within a desired temperature range.

26. An injector according to claim 25, wherein said desired temperature range comprises 5° C. to 85° C.

27. An injector in accordance with claim 1, wherein a pressure of said reagent in said injector body is in a range of approximately 60 to 80 pounds per square inch.

28. An injector in accordance with claim 1, wherein said plurality of whirl slots comprises at least four whirl slots.

29. An injector in accordance with claim 1, wherein:
- said whirl chamber is provided in a whirl plate; and
- said whirl plate is removable from said injector body.

30. An injector according to claim 29, wherein different whirl plates with correspondingly different characteristics can be interchanged in said injector body for different applications of said injector.

31. An injector in accordance with claim 30, wherein said different whirl plates provide different spray patterns of said reagent metered from said exit orifice.

32. An injector in accordance with claim 30, wherein said different characteristics of said different whirl plates comprise at least one of a different number of whirl slots, whirl slots of different length, whirl slots of different width, whirl slots of different depth, a differently sized whirl chamber, and a differently sized exit orifice.

33. An injector in accordance with claim 1, wherein the whirl slots are arranged transversely to a longitudinal axis of the metering plug.

34. An injector in accordance with claim 1, wherein the reagent inlet is proximate the whirl chamber.

35. An injector in accordance with claim 1, wherein:
- all reagent flowing through said injector body flows through said plurality of whirl slots and into said whirl chamber to provide maximum cooling of said whirl chamber and maximum rotational velocity to said reagent in said whirl chamber.

36. An injector in accordance with claim 1, wherein:
- said exit orifice is recessed from a tip of the injector to limit exposure of said exit orifice to high temperatures and to minimize fouling and deposits proximate said exit orifice.

37. An injector in accordance with claim 1, wherein:
- an amount of reagent circulated through said injector body for said cooling is greater than an amount of reagent dispensed from said exit orifice.

38. A method for injecting atomized reagent at low pressure, comprising:
- introducing a reagent into a lower section of an injector body;
- imparting a rotational velocity to said reagent by circulating said reagent through a conical whirl chamber having a plurality of whirl slots, said whirl chamber arranged on said lower section of said injector body;
- controlling movement of a metering plug arranged within the injector body between closed and open positions;
- providing a flow path through the injector body, said flow path comprising a reagent inlet arranged in said lower section of said injector body, said whirl slots, said whirl chamber, a hollow portion extending through said metering plug, and a reagent outlet arranged in an upper section of said injector body;
- continuously circulating said reagent through said flow path, thereby enabling continuous cooling of said injector in both the open and closed position of said metering plug;
- metering atomized reagent from an exit orifice of the whirl chamber when said metering plug is in said open position.

39. A method in accordance with claim 38, wherein:
- an amount of reagent circulated through said injector body for said cooling is greater than an amount of reagent metered from said exit orifice.

* * * * *